(12) United States Patent
Burke

(10) Patent No.: US 7,811,455 B2
(45) Date of Patent: Oct. 12, 2010

(54) REMOVAL OF AMMONIA FROM FERMENTATION EFFLUENT AND SEQUESTRATION AS AMMONIUM BICARBONATE AND/OR CARBONATE

(76) Inventor: Dennis A. Burke, 6007 Hill St. NE., Olympia, WA (US) 98516

( * ) Notice: Subject to any disclaimer, the term of this patent is extended or adjusted under 35 U.S.C. 154(b) by 232 days.

(21) Appl. No.: 12/157,158

(22) Filed: Jun. 5, 2008

(65) Prior Publication Data

US 2008/0302722 A1 Dec. 11, 2008

Related U.S. Application Data

(60) Provisional application No. 60/933,337, filed on Jun. 7, 2007.

(51) Int. Cl.
*C02F 3/28* (2006.01)
(52) U.S. Cl. .................. 210/603; 210/631; 210/903; 423/237
(58) Field of Classification Search ................ 210/603, 210/605, 630, 631, 903; 423/237
See application file for complete search history.

(56) References Cited

U.S. PATENT DOCUMENTS

| | | | |
|---|---|---|---|
| 4,104,131 A | 8/1978 | Didycz et al. | |
| 4,137,158 A | 1/1979 | Ishida et al. | |
| 4,372,856 A | 2/1983 | Morrison | |
| 4,710,300 A | 12/1987 | Kristoufek | |
| 4,781,836 A | 11/1988 | Thiele et al. | |
| 4,824,571 A | 4/1989 | Ducellier et al. | |
| 4,869,819 A | 9/1989 | Thiele et al. | |
| 5,529,692 A | 6/1996 | Kubler | |
| 5,702,572 A | 12/1997 | Fujimura et al. | |
| 5,885,460 A | 3/1999 | Dague et al. | |
| 6,299,774 B1 | 10/2001 | Ainsworth et al. | |
| 6,368,849 B1 | 4/2002 | Norddahl | |
| 6,464,875 B1 | 10/2002 | Woodruff | |
| 6,521,129 B1 | 2/2003 | Stamper et al. | |
| 6,866,779 B1 * | 3/2005 | Burke | 210/603 |
| 6,942,798 B2 | 9/2005 | Miller, III | |
| 7,160,456 B2 | 1/2007 | Jarventie | |
| 7,169,821 B2 | 1/2007 | Branson | |
| 7,381,389 B2 * | 6/2008 | Harada et al. | 423/237 |
| 2004/0164021 A1 * | 8/2004 | Li et al. | 210/603 |

* cited by examiner

*Primary Examiner*—Fred Prince
(74) *Attorney, Agent, or Firm*—Brian J. Coyne

(57) ABSTRACT

A method for the removal and sequestration of ammonia nitrogen from anaerobic fermentation effluent while producing a higher BTU biogas. The method includes the steps of removing the slurry from the digester, stripping the ammonia from the slurry or portion thereof with a high BTU biogas, blending the stripped ammonia with the digesters biogas to remove the carbon dioxide and precipitate ammonium bicarbonate/carbonate as a solid while producing a high Btu biogas, a portion of which is used to strip the ammonia and $CO_2$ from the slurry. The process removes ammonia nitrogen from the digester effluent while producing a high Btu biogas and a solid ammonium bicarbonate/carbonate product. Ammonia stripping is accomplished with a recycled stripping gas deficient in $CO_2$ and ammonia that is capable of removing the $CO_2$ and ammonia from solution by virtue of the lower partial pressures of $CO_2$ and ammonia in the stripping unit.

30 Claims, 3 Drawing Sheets

REMOVAL OF AMMONIA FROM FERMENTATION EFFLUENT AND SEQUESTRATION AS AMMONIUM BICARBONATE AND/OR CARBONATE

CROSS REFERENCE TO RELATED APPLICATIONS

This application claims the benefit of a provisional application by the same applicant for the same invention filed on Jun. 7, 2007, application No. 60/933,337.

STATEMENT REGARDING GOVERNMENT SPONSORED RESEARCH

None.

BACKGROUND OF THE INVENTION

1. Field of the Invention

This invention relates generally to waste conversion processes, and, more particularly, to methods for abating the release into the environment of ammonia produced by anaerobic digestion.

2. Description of Related Art

Waste conversion processes such as anaerobic digestion convert protein and other nitrogenous compounds to ammonia that is discharged with the liquid and solid slurry (digestate). Typically the slurry is discharged to holding ponds or the land as a fertilizer. The solid portion of the digestate may be separated from the liquid. Typically the liquid containing ammonia is returned to an aerobic waste treatment plant or discharged to land or water bodies where adverse environmental and economic consequences can occur. The uncontrolled discharge of ammonia to the atmosphere may cause its reaction with atmospheric $NO_x$ leading to the creation of fine particulate matter ($<PM_{2.5}$) that may create a significant health hazard. The ammonia eventually undergoes nitrification and denitrification, a process that generates nitrous oxide, a powerful greenhouse gas. Uncontrolled discharges of ammonia fertilize land and water creating unforeseen ecological damage. Consequently, there exists a need to control ammonia emissions from the anaerobic digestate.

The anaerobic decomposition of organic substrates also produces a biogas containing methane gas, carbon dioxide, and traces of ammonia, and hydrogen sulfide. In many cases it is desirable to produce a higher quality biogas consisting of primarily methane gas and having a high BTU content. High BTU biomethane has a significantly greater economic value if sold as biomethane than if used to produce electricity.

In the anaerobic digestion process the quantity of methane, carbon dioxide, ammonia nitrogen, and hydrogen sulfide formed is a function of the chemical composition of the substrate and the efficiency (percent conversion of organic matter) of the anaerobic digestion process. Ammonia, hydrogen sulfide, and carbon dioxide exist both as a gas (nonionized $NH_3$, $CO_2$, $H_2S$) and in the ionized form ($HCO_3^-$, $NH_4^+$, $HS^-$). The total nitrogen, carbon and sulfur are partitioned between the gas form and ionized form as a function of pH and temperature. At the mesophilic temperature and relatively neutral pH of an anaerobic reactor only a small percentage of the total ammonia is present in the gas form whereas approximately fifty percent of the total carbon and sulfide resides in the gas form. The ammonia, carbon dioxide, and hydrogen sulfide gas present in the headspace of an anaerobic reactor is a function of the solubility of the gas in solution, all in accordance with Henry's Law. Typically the volume percent, and thus partial pressure, of the digester gas is 65% methane, 34% $CO_2$ with a small percentage being hydrogen sulfide (200-3,000 ppm) and other gases. There is very little ammonia nitrogen in the digesters headspace and thus very little ammonia nitrogen in solution in the gaseous form.

Upon exiting the anaerobic reactor, $CO_2$ gas is discharged from the slurry to the atmosphere since the partial pressure of $CO_2$ in the atmosphere is only 0.038% or $\frac{1}{1000}$ the $CO_2$ partial pressure in the digester. The loss of $CO_2$ causes the pH of the slurry to increase resulting in the eventual shifting of the ionized ammonia ($NH_4^+$) to the unionized gas form ($NH_3$) and the subsequent discharge of ammonia gas to the atmosphere.

Many strategies have been developed to remove and sequester ammonia nitrogen from the effluent of an anaerobic reactor. The basic strategy is to remove the ammonia from solution and form a second liquid or solid ammonium compound. Removing the ammonia from the digester effluent is normally preceded by decarbonization to remove $CO_2$, followed by the addition of a chemical reagent, such as calcium, sodium or magnesium hydroxide to raise the solution pH and thereby shift the ionized ammonium to the unionized ammonia gas form (U.S. Pat. No. 4,104,131). Air containing a low concentration of ammonia is then used to strip the ammonia gas from solution. Steam has also been used to raise temperature, reduce the solubility of carbon dioxide, increase the pH, and strip ammonia gas from solution by reducing the pressure and thereby decreasing the partial pressure of $CO_2$ (U.S. Pat. No. 6,521,129). High temperature (60-70° C.) reduced pressure (0.25-0.75 bar) stripping has also been proposed (U.S. Pat. No. 6,368,849 B1). High temperature distillation or rectification of carbon dioxide and ammonia at an elevated temperature has been proposed (U.S. Pat. Nos. 4,710,300 and 6,368,849 B1). Membrane processes with decarbonization and pH adjustment have likewise been proposed. Pressurizing the digester contents and driving $CO_2$ into solution has also been practiced. All these processes require a significant investment in energy for heat and pressure, and reagents for pH adjustment. Scale formation is a common problem if calcium or magnesium is used to adjust pH. Rectification or high temperature stripping requires the removal of most suspended solids prior to high temperature steam stripping or rectification.

Following ammonia stripping the ammonia can be sequestered through a variety of means. If high-temperature distillation is used to remove both carbon dioxide and ammonia, the uncontrolled formation of ammonium bicarbonate solids (scale) can be mechanically removed from the stripping unit (U.S. Pat. No. 4,710,300). If the ammonia is stripped with air or steam, anhydrous ammonia or aqueous ammonia can be formed at a reduced pH (U.S. Pat. No. 6,464,875, U.S. Pat. No. 5,702,572). If ammonia is stripped with air or steam ammonium salts can be formed through a reaction with a dilute acid (U.S. Pat. No. 6,521,129).

Biological processes have been used to remove ammonia nitrogen. They include aerobic nitrification and denitrification and the anaerobic Anammox process whereby ammonia is anaerobically converted to nitrogen gas resulting in the loss of ammonia nitrogen's fertilizer value.

High temperature reduced pressure stripping, as well as distillation to remove both carbon dioxide and ammonia will improve the biogas quality since a portion of the carbon dioxide is removed from the gas stream under the high temperature conditions (U.S. Pat. No. 4,710,300). Improved gas quality has also been claimed when digesting a substrate having a high concentration of nitrogen through the formation of ammonium bicarbonate in solution (U.S. Pat. No. 7,160,456 B2). Also, biogas quality improvements have been claimed for processes that pass biogas through the digester liquid containing ammonia to form ammonium carbonate in the liquid slurry (U.S. Pat. No. 4,372,856, and U.S. Pat. No. 7,160,456).

A variety of processes are utilized to directly improve the BTU content of biogas. These processes involve the removal of carbon dioxide by high-pressure water scrubbing (U.S. Pat. No. 6,299,774), amine scrubbing, and membrane separation. Most of the systems involved high-pressure operation with significant capital and operation and maintenance costs. Biological processes have also been used such as acid phase anaerobic digestion (U.S. Pat. No. 5,529,692) where the $CO_2$, formed in the acid phase, is separately removed from the predominately methane gas stream from the methane phase.

The economics of ammonia removal and sequestration, as well as the production of a high BTU biogas, can be improved significantly by operating a low pressure, low temperature, process that can remove substantially all of the ammonia while controlling the quality of the biogas produced. The process would be even more advantageous if it can be performed without the use of costly chemical reagents that increase the salt content of the effluent, or costly energy in the form of heat and steam.

SUMMARY OF THE INVENTION

The object of this invention to is provide an economical low-pressure, low temperature, and low operating cost process to remove ammonia from a fermentation process, reclaim the ammonia as a solid product, and produce a high BTU biogas having an improved economic value. The removal of ammonia will reduce the health hazards, water and land fertilization, and greenhouse gas emissions associated with ammonia emissions from the anaerobic decomposition of organic matter. Reclamation of ammonia is desirable since it has significant economic value and its reclamation will reduce the consumption of fossil fuel used in the production of ammonia. A high BTU gas has greater economic value when compared to the typical biogas produced through anaerobic digestion.

The process can be used with any anaerobic reactor configuration including mesophilic, thermophilic, plug flow, completely mixed, sequencing batch, temperature phased, acid phased, contact, migrating bed, induced blanket, etc. that receives an organic influent stream and produces an effluent stream and biogas stream containing carbon dioxide. The anaerobic reactor can process any of a variety of organic substrates having any solids or volatile solids concentration including but not limited to manure, crop residue, food processing and meat packing waste, the organic fraction of municipal solid waste, and sewage sludge.

The effluent stream from the fermentation reactor, containing the byproducts of anaerobic decomposition including ammonia nitrogen, primarily in the ionized form, is subjected to carbon dioxide and ammonia stripping, preferably in a low pressure, packed tower or shallow basin, with a gas deficient in carbon dioxide and ammonia such that the partial pressure of ammonia and carbon dioxide in the stripping gas is less than the partial pressure in the stripping chamber. The liquid effluent from the stripping chamber, deficient in ammonia and carbon dioxide, is then discharged, or further treated with a variety of processes to adjust the pH or, recycled to the anaerobic reactor for hydration and, or alkaline or acid hydrolysis of the influent waste stream. The gas effluent from the stripping chamber, containing ammonia, water vapor, methane, and carbon dioxide is then blended with biogas containing methane, carbon dioxide, and traces of other pollutants, to produce a gas containing primarily ammonia, methane, and carbon dioxide. The blended gas is then transferred to a precipitation chamber where ammonium bicarbonate/carbonate is precipitated and recovered as a product that can be used for a variety of purposes. A portion of the effluent gas, deficient in carbon dioxide and ammonia is then used as the stripping gas in the stripping chamber.

A variety of modifications and improvements can be made to the basic process described above. They include: a) reducing the pressure (0.5 to 0.75 bar) in the stripping chamber to assist the removal of carbon dioxide and ammonia, b) adjusting the pH (preferable between 9 and 12) prior to or during the ammonia stripping process through the use of a variety of reagents such as calcium, magnesium hydroxide, magnesium oxide, sodium hydroxide, or potassium hydroxide, c) separating the solids from the liquid effluent and subjecting only the liquid effluent to ammonia stripping, d) adjusting the pH of the liquid through the consumption of bicarbonate/carbonate in a photobioreactor with photosynthetic organisms, preferably cyanobacteria such as spirulina, prior to or during the stripping process, e) removing the $O_2$ produced through photobioreactor treatment, f) diluting the stripping liquid to reduce ammonia toxicity to the photosynthetic organisms, g) providing the proper molar ratio of carbon dioxide to ammonia necessary for the complete or near complete conversion of ammonia and carbon dioxide to ammonium carbonate/bicarbonate precipitate by using a portion of the anaerobic digester's biogas for operating an engine generator, boiler, turban, or flair and thereby reduce the quantity of CO2 delivered to the precipitation chamber, or adding supplemental ammonia to the precipitation chamber, and or increasing the nitrogen content of the substrate delivered to the digester such that more ammonia is produced, h) improving the quality of the high BTU gas produced by removing substantially all of the CO2 through further gas treatment such as high pH gas scrubbing with or without use of the liquid effluent from the scrubbing unit, i) confining the precipitation of ammonium carbonate/bicarbonate to the precipitation chamber by maintaining a temperature differential between the ammonia stripping chamber and the precipitation chamber where the precipitation chamber is maintained at a lower temperature sufficient to precipitate the ammonium carbonate/bicarbonate, j) treating the biogas prior to blending with the stripped (ammonia and carbon dioxide) gas to remove hydrogen sulfide and or carbon dioxide through a variety of processes, such as membrane separation, that produce a tale gas having a concentration of carbon dioxide greater than the biogas and processing the tail gas through the ammonium carbonate bicarbonate precipitation chamber, k) heating the stripping gas prior to entering the stripping chamber, l) cooling the stripped ammonia gas prior to entering the precipitation chamber, m) heating the digestate prior to entering the stripping chamber, n) separating the solids from the digestate and processing only the liquid containing ammonia through the stripping unit, o) aerobically composting or drying the separated solids to form a soil conditioner deficient in nitrogen, p) mixing the ammonium carbonate/bicarbonate with the carbon and phosphate containing solids or soil conditioner to produce a fertilizer with the desired C:N ratio.

The stripping chamber can consist of a plurality of chambers to improve the stripping efficiency and the precipitation chamber can likewise consist of a plurality of chambers to improve the efficiency of precipitation, as well as enhance the removal of the carbonate/bicarbonate precipitate (sequencing batch operation). It is also understood, that a variety of support media can be used within the precipitation chamber upon which the ammonium carbonate/bicarbonate will be precipitated and be recovered.

The process comprises six steps, described as follows:
1. Increase the pH of the liquid effluent from the digester by removing carbon dioxide, adding chemical reagents, or consuming the bicarbonate/carbonate within the liquid.
2. Shifting ammonium (NH4+) to ammonia gas (NH3) by increasing the pH or the pH and temperature.
3. Stripping the ammonia gas by reducing the partial pressure of ammonia through the use of a gas deficient in ammonia.
4. Blending the ammonia gas with biogas containing sufficient moisture and carbon dioxide to precipitate the ammonium carbonate bicarbonate in accordance with the following equation. $NH_3+H_2O+CO_2>NH_4HCO_3$
5. Precipitating the ammonium carbonate/bicarbonate at a temperature (<36° C.) sufficient to form a solid product and thereby remove ammonia and carbon dioxide from the gas stream.
6. Returning the gas stream, deficient in ammonia and carbon dioxide, for stripping.

Although any of a variety of modifications, options, or combination of options may be incorporated in the process as described above, a preferred embodiment consists of the following:
1. Separating the solids from the liquid in the digester effluent.
2. Increase the pH of the liquid effluent from the digester by removing carbon dioxide and carbonate from the liquid with photosynthetic organisms such as cyanobacteria.
3. Converting ammonium (NH4+) to ammonia gas (NH3) by virtue of the increased pH.
4. Stripping the ammonia gas by reducing the partial pressure of ammonia through the use of a stripping gas deficient in ammonia and reducing the pressure (0.25-0.75 bar) in the stripping chamber.
5. Removing hydrogen sulfide from the biogas.
6. Blending the ammonia gas with a portion of the biogas containing sufficient moisture and carbon dioxide to precipitate the ammonium bicarbonate in accordance with the following equation, $NH_3+H_2O+CO_2>NH_4HCO_3$. The balance of the biogas is used to operate a boiler or engine generator to provide heat for the digester.
7. Maintaining a temperature differential between the stripping chamber, biogas blending chamber, and precipitating the ammonium carbonate/bicarbonate at a temperature (<36° C.) sufficient to form a solid product within the precipitation chamber and thereby remove ammonia and carbon dioxide from the gas stream.
8. Removing excess water created by cooling the influent gas stream prior to or within the precipitation chamber and heating the return stripping gas to the stripping chamber.
9. Returning a portion of the gas stream, deficient in ammonia and carbon dioxide, for stripping.
10. Drying the separated solids deficient in nitrogen.
11. Mixing the ammonium carbonate/bicarbonate with the dried carbon and phosphate containing solids to produce a fertilizer with any desired C:N ratio.

BRIEF DESCRIPTION OF THE DRAWINGS

FIG. 1 depicts the preferred embodiment of the invention with the solid lines representing the basic components of the invention and the dashed lines presenting preferred alternative embodiments.

FIG. 2 depicts the basic embodiment as solid lines with a number of alternative or optional embodiments of the invention as dashed lines.

DETAILED DESCRIPTION OF THE INVENTION

The object of this invention to is provide an economical low-pressure, low temperature, and low operating cost process to remove ammonia from an anaerobic fermentation process, reclaim the ammonia as a solid product, and produce a high BTU biogas having an improved economic value. The removal of ammonia will reduce the health hazards, inadvertent water and land fertilization, and greenhouse gas consequences associated with ammonia emissions from the anaerobic decomposition of organic matter. Reclamation of ammonia is desirable since it has significant economic value and its reclamation will reduce the consumption of fossil fuel used in the production of ammonia. A high BTU gas has greater economic value when compared to the typical biogas produced through anaerobic digestion. The invention achieves its economic advantage by circulating high BTU methane gas, produced by the process, to strip the ammonia nitrogen as opposed to high temperature steam stripping or distillation processes that have been proposed in the past.

Figure 1:
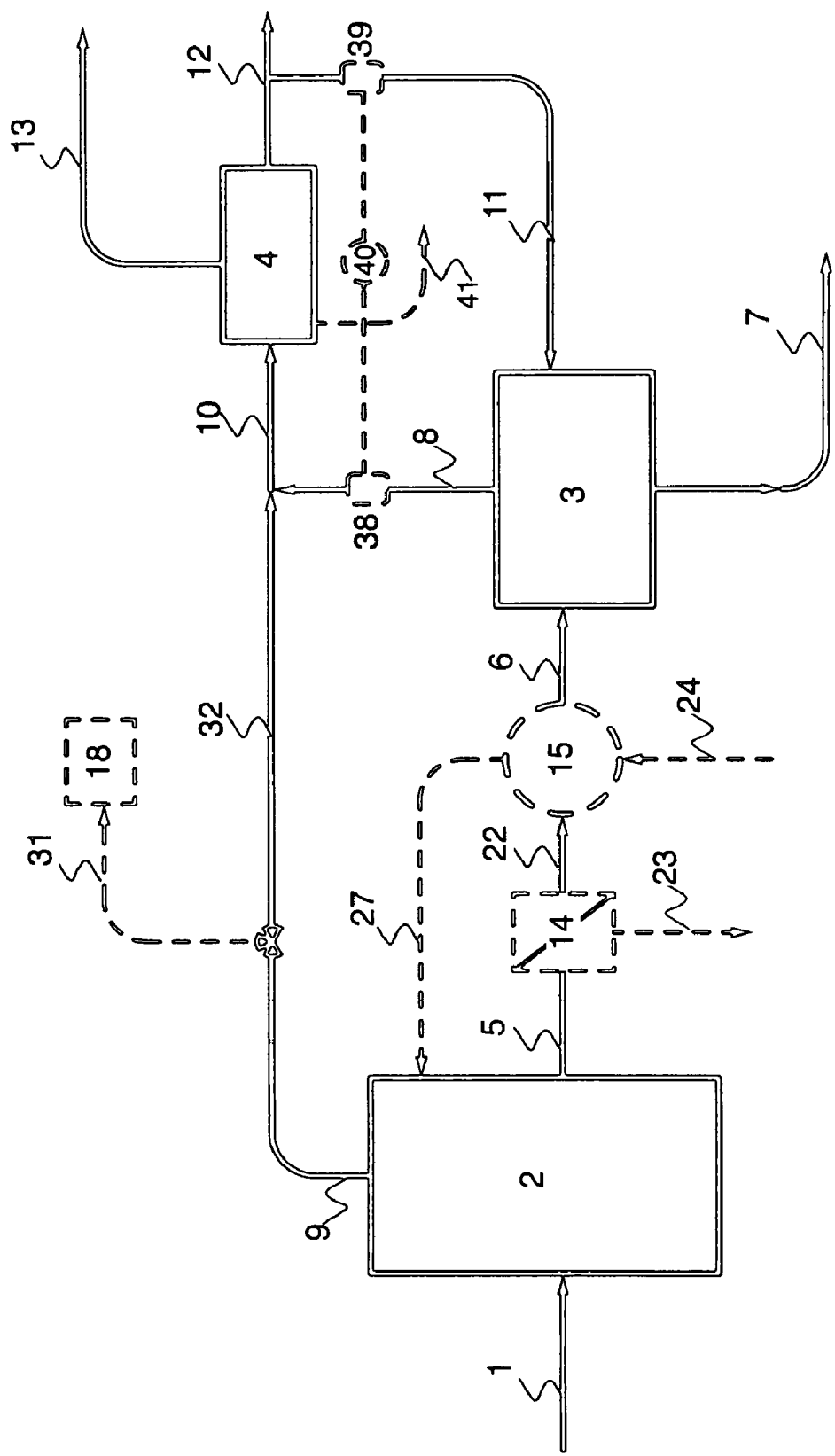
FIGS. 1 and 2 depict a schematic representation of the preferred and optional embodiments of the invention.

The basic configuration and preferred embodiment of the process are presented in FIG. 1. In the process an organic stream 1 is delivered to an anaerobic digester 2. The organic stream 1, can be any organic substrate having any solids or volatile solids concentration including, but not limited to, manure, crop residue, food processing and meat packing waste, the organic fraction of municipal solid waste, and sewage sludge or any combination thereof. The fermentation reactor can be any anaerobic digester configuration including, but not limited to, mesophilic, thermophilic, plug flow, completely mixed, sequencing batch, temperature phased, acid phased, contact, migrating bed, induced blanket, etc. that receives an organic influent stream 1, and produces a digestate stream 5, and biogas stream 9, containing carbon dioxide, methane and traces of other gases.

The effluent stream 5, from the fermentation reactor containing the byproducts of anaerobic decomposition including ammonia nitrogen primarily in the ionized form, is subjected to carbon dioxide consumption and ammonia stripping, preferably in a low pressure tower or shallow basin 3, with a gas deficient in carbon dioxide and ammonia such that the partial pressure of ammonia and carbon dioxide in the stripping gas 11 is less than their partial pressures in the stripping chamber 3. The liquid effluent 7 from the stripping chamber 3, deficient in ammonia and carbon dioxide, is then discharged, or further treated with a variety of processes to adjust the pH or, recycled to the anaerobic reactor for hydration of the influent 1, and, or hydrolysis of the influent waste stream 1. The gas effluent 8 from the stripping chamber, containing water vapor, ammonia and carbon dioxide, is then blended with biogas 9 to produce a gas containing water vapor, ammonia, methane, and carbon dioxide 10. The blended gas is then transferred to a precipitation chamber 4, where ammonium bicarbonate/ carbonate is precipitated and recovered for productive use. A portion 11 of the effluent gas 12, deficient in carbon dioxide and ammonia, is then used as the stripping gas in the stripping chamber 3. The stripping chamber 3 can be a series of chambers, covered shallow basins, or stripping towers, where progressive pH adjustment and gas stripping occur. The precipitation chamber can be a series of chambers operating in parallel or as sequencing batch reactors to accommodate the removal of ammonium carbonate/bicarbonate. The precipitation chamber 4, may also be a packed reactor containing a variety of synthetic organic media upon which the ammonium carbonate/bicarbonate will precipitate and be removed. The precipitation chamber may also be cooled, through a variety of means, to maintain a temperature less than 40° C. or preferably less than 35° C. since ammonium bicarbonate endothermically decomposes between 36° C. and 60° C. The ammonium carbonate/bicarbonate 13, can be removed with or without the packing material from precipitation chamber 4 through a variety of commonly practiced methods.

A variety of modifications and improvements can be made to the basic process described above. Those preferred modifications include the addition of one or more liquids/solids separators 14 on the digester's effluent line 5, to produce a solid stream 23 and a liquid stream 22 deficient in suspended solids. A second preferred modification includes the addition of a separate reactor 15, with or without liquids/solids separation device (not shown), to provide pH adjustment through either the addition of caustic 24, or reduced-pressure, vacuum pump removal of carbon dioxide through conduit 27, which is discharged to the digester 2, or a combination of both low pressure and caustic addition. The caustic reagents can be oxides or hydroxides such as calcium (lime), magnesium oxide, or sodium, potassium, magnesium hydroxide or a combination thereof. Depending on the effluent 22 quality of the liquid/solids separator or separators 14, the pH adjusting reactor 15 may be a photobioreactor for culturing photosynthetic microorganisms, preferably cyanobacteria or spirulina that consume carbonate/bicarbonate in the absence of $CO_2$ addition and thereby increase the pH of the liquid to be stripped 6 of ammonia. Gases in conduit 27 produced in the pH-adjusting reactor 15 can be discharged to the digester 2.

A third preferred modification includes the controlled removal of biogas 31 to reduce the gas volume 32 and produce a gas 10 that meets the stoichiometric requirements for the precipitation of substantially all of the $CO_2$ and NH3 as ammonium carbonate/bicarbonate in accordance with the following formula: $NH_3+H_2O+CO_2=NH_4HCO_3$. In most cases insufficient ammonia will be produced through the anaerobic decomposition of most substrates. Consequently, it will be necessary to either reduce the carbon dioxide content of the gas or increase the ammonia content, through the addition of ammonia, in order to maximize the methane content of a high BTU gas produced. This can be achieved by removing biogas and utilizing the removed biogas 31 in an engine generator to produce electricity or combined heat and power, a boiler to produce heat for the anaerobic process, or a flare 18.

A fourth preferred modification includes the addition of heat exchangers 38 and 39 for removing heat from the stripped gas 8 with cooling unit 38 and providing heat to the stripping gas 11 through heat exchanger 39. The removal of heat and cooling may be accomplished with heat pump 40. Excess water 41 removed through the cooling of the fully saturated gas stream can be recycled or discharged.

Figure 2:
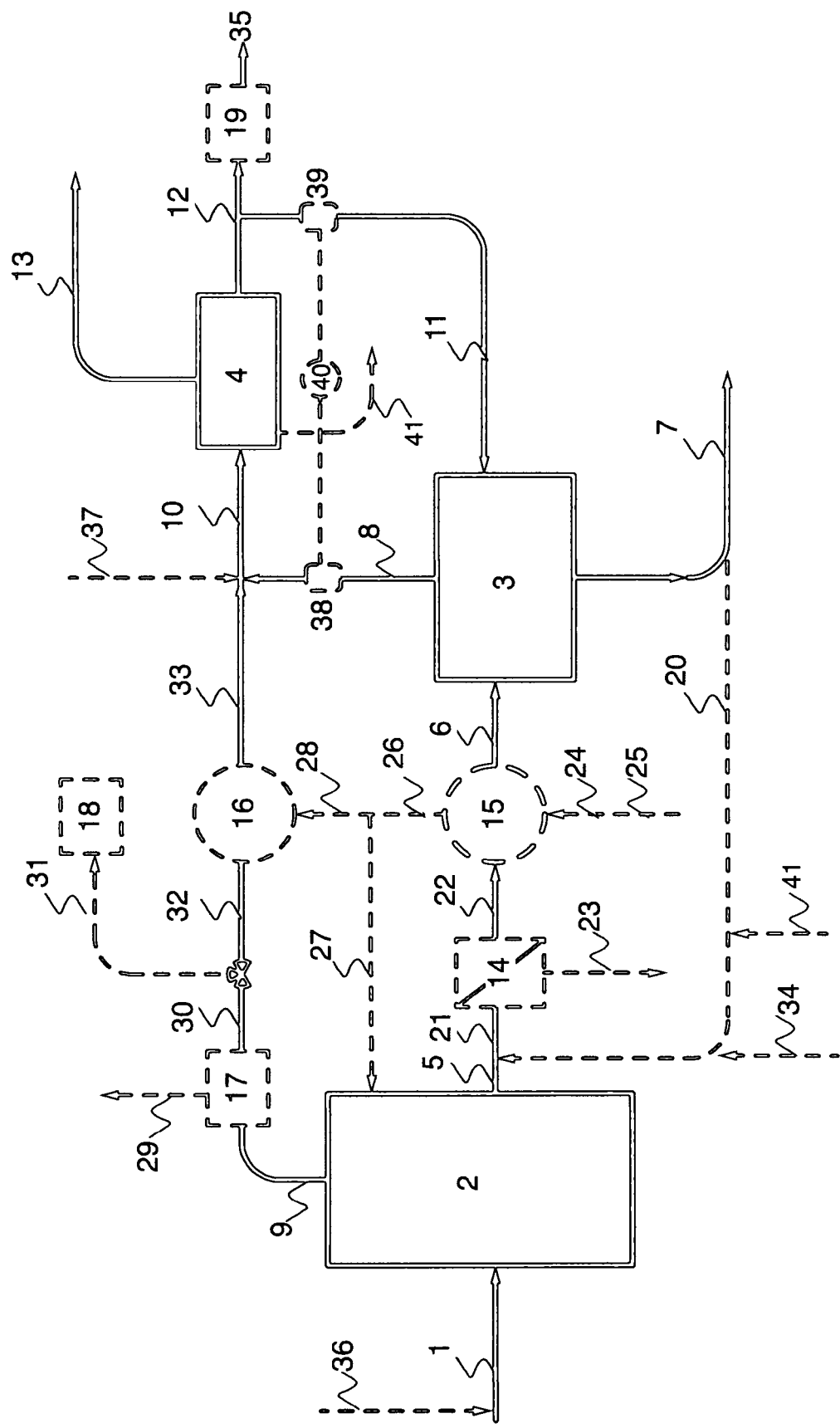

FIG. 2 presents a variety of additional, optional embodiments, described below, that may be used individually or in any combination depending on the process application. A portion 20 of the liquid effluent from the stripping chamber may be recycled to the digester's effluent 5, either before or after the liquids/solids separator 14, to produce a diluted effluent 22. The purpose of returning a portion of the effluent, deficient in nitrogen, is to reduce the ammonia concentration of the pH reactor 15 below values that might inhibit photosynthetic microorganisms, such as cyanobacteria, utilized to consume carbonate/bicarbonate and thereby raise the pH. Freshwater 34, or recycled condensate 41 may be added two assist in producing a reduced-nutrient recycle stream. If microorganisms are utilized in chamber 15 to reduce the pH of the influent 6 to the stripping unit 3, dissolved oxygen will be produced as a consequence in accordance with the equation $6CO_2+12H_2O>6(CH_2O)+6H_2O+6O_2$. Six mol of $CO_2$ will produce 6 mol of cell mass+6 mol of oxygen. The cell mass will exit the system in the stripping chamber effluent 7 or be separated and returned within or external to the photobioreactor 15. The oxygen however may be stripped in the stripping chamber and thereby contaminate the high BTU gas with oxygen. To prevent this occurrence any inert gas or high BTU biogas 25, may be added to pH adjusting chamber 15 to strip the oxygen produced. The gas discharged 26 from the pH-adjusting chamber 15 may contain oxygen and a stripping gas. If biogas or biomethane is utilized for stripping oxygen the resulting gas 28, may be discharged to a biological hydrogen sulfide removal chamber 16, wherein aerobic bacteria will consume the oxygen and produce a $CO_2$ and methane gas stream 33 reduced in oxygen. Alternatively, the stripping gas, carbon dioxide, and oxygen may be discharged to the anaerobic digester through conduit 27. The hydrogen sulfide removal chamber 16 can be any of a variety of oxygen consuming biological hydrogen sulfide removal devices or processes commonly utilized or known to those skilled in the art.

An alternative to using a portion of the anaerobic digester's biogas to provide the proper molar ratio of carbon dioxide to ammonia necessary for the complete, or near complete, conversion of ammonia and carbon dioxide to ammonium carbonate/bicarbonate precipitate, is to add a supplemental substrate rich in ammonia 36 to the influent waste stream, or add ammonia gas to the gas stream 37.

It may be advantageous to remove methane gas 29, from all or a portion of the biogas 9, through any of a variety of known processes 17, such as membrane separators or PSA (Pressure Swing Adsorption), X and thereby produce a "tail gas" rich in carbon dioxide but deficient in methane 30. Under this scenario, the invention will treat the tail gas 30 to remove the carbon dioxide through the production of ammonium carbonate/bicarbonate 13. A portion of the high BTU gas produced 12 or 35, may be returned to the digester 2, blended with the methane gas 29, or used for some other productive purpose such as 18. It may also be advantageous to further treat the high BTU gas 12 with a variety of processes 19 known in the art, such as alkaline scrubbing to further remove carbon dioxide and or other pollutants and thereby produce pipeline quality, or transportation quality, gas 35.

The stripping gas 11, or the influent to the stripping chamber 6, 21, 22, or 5 or the contents of the stripping chamber may be heated to improve stripping efficiency; and, the influent streams to the precipitation chamber 10, 8, or 33, or the contents of the precipitation chamber 4, may be cooled to assist in the formation of ammonium carbonate/bicarbonate or to remove excess water such that a dry ammonium carbonate product can be produced in accordance with the stoichiometric requirements.

EXAMPLE

Figure 3:
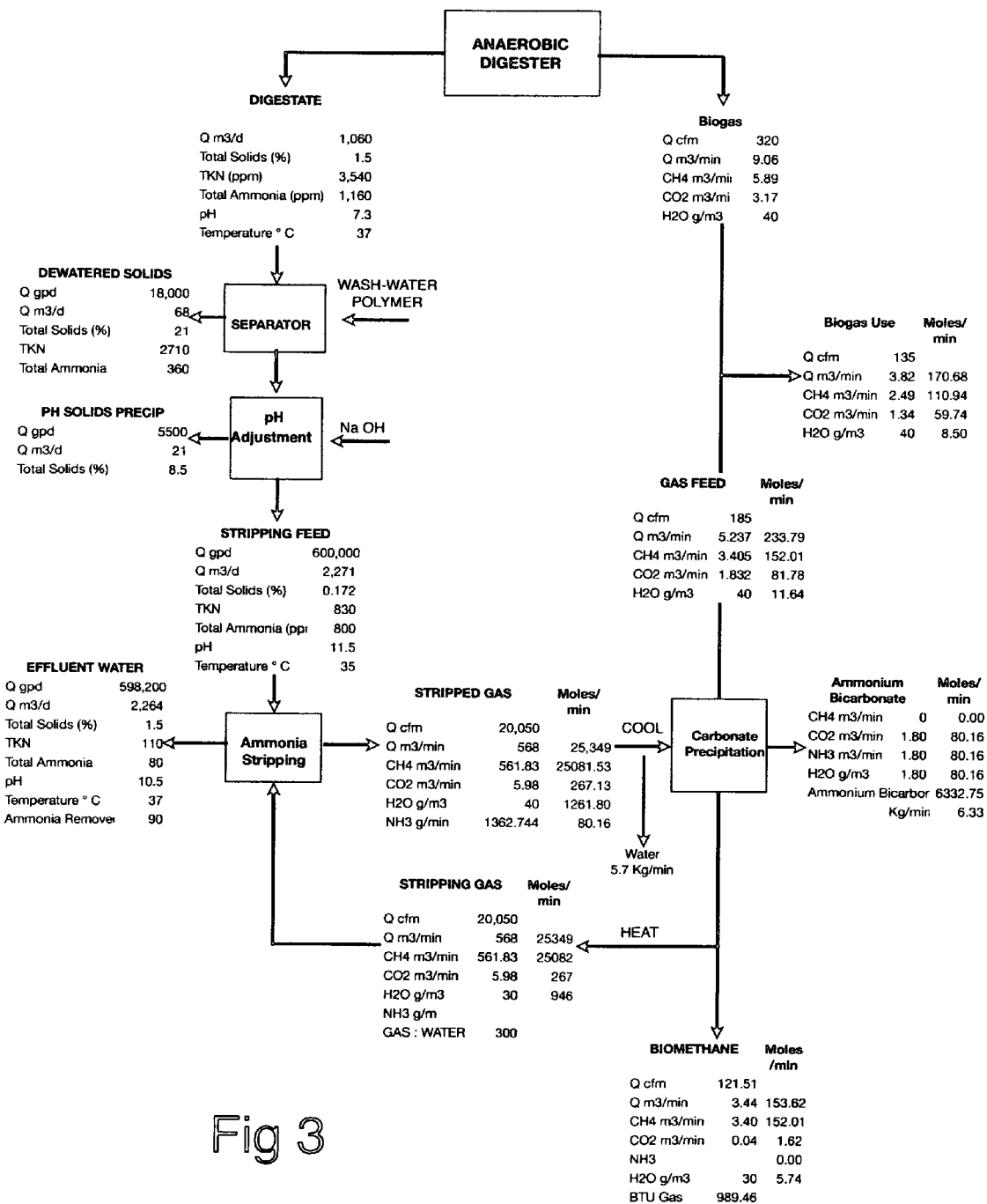
FIG. 3 presents a mass balance for a full-scale facility, wherein "TKN" refers to total Kjeldahl nitrogen and "Q" refers to volumetric flow rate. Except for a heat pump included in FIGS. 1 and 2, the drawings do not include pumps, valves and appurtenances normally included in a process design of this kind.

FIG. 3 presents an example of ammonia sequestration at a municipal anaerobic digestion facility. The anaerobic digester produces two effluent streams, biogas and digestate. The digestate was dewatered with a belt filter press that requires significant quantities of wash water and polymer. The separation process produced 68 m3 per day of 21% dry solids. The effluent from the belt filter presses was further treated with sodium hydroxide to raise the pH to 11.5 and precipitate and concentrate colloidal solid material. Twenty-one m3 per day of 8.5% precipitate was removed through the pH adjustment process. The wash water and chemical reagent deluded stripping feed was then delivered to the ammonia stripping tower. The flow rate of the stripping gas was 300 times the flow rate of the stripping feed in order to achieve a 90% removal of ammonia. The heated stripping gas contained primarily methane gas with traces of carbon dioxide. The fully saturated stripped gas from the ammonia stripping tower contained a majority of the ammonia fed to the stripping tower and the methane gas initially present in the stripping gas. After cooling and removal of excess moisture the gas was delivered to the ammonia precipitation reactor. The stripped gas was blended with the feed biogas in the precipitation reactor to produce 6.3 kg/min of ammonium bicarbonate. The feed biogas was less than 60% of the total biogas since a portion of the biogas is flared or utilized in and engine generator to produce power for the facility and heat for the anaerobic digesters. A portion of the biogas was flared in order to produce a 99% methane, "biomethane gas" product for pipeline injection.

Thus, the presently disclosed embodiments are to be considered in all respects as illustrative and not restrictive, the scope of the invention being indicated by the appended claims, and not limited to the foregoing description.

I claim:

1. A process for recovering ammonia nitrogen as a solid ammonium carbonate and/or bicarbonate from a liquid effluent stream (digestate) of an anaerobic digester while improving the BTU content of a biogas effluent stream of the digester, comprising the steps of:
   a. converting ammonium ion ($NH_4+$) in the digestate to ammonia gas ($NH_3$) by increasing the pH or the pH and temperature of the digestate, thereby forming a pH-adjusted digestate;
   b. stripping the ammonia gas from the pH-adjusted digestate within a stripping chamber by reducing the partial pressure of ammonia within said chamber to form a stripped ammonia gas;
   c. blending the stripped ammonia gas with biogas containing carbon dioxide to precipitate ammonium carbonate and/or bicarbonate, thereby forming a gas deficient in ammonia and carbon dioxide; and
   d. returning the gas deficient in ammonia and carbon dioxide (stripping gas) to the stripping chamber to maintain a low partial pressure of ammonia within said chamber.

2. A process according to claim 1, further comprising diluting the digestate with a liquid deficient in ammonia prior to step a.

3. A process according to claim 1, further comprising diluting the digestate within the digester with a substrate that is deficient in ammonia.

4. A process according to claim 1, further comprising adding ammonia to the digestate prior to step b to increase the ammonia concentration of the digestate.

5. A process according to claim 1, further comprising adding a substrate containing nitrogen to the digestate within the digester to increase the ammonia concentration of the digestate.

6. The process as in any of claims 1-5, wherein the pH of the digestate is increased in step a by gas stripping or reduced pressure stripping of carbon dioxide.

7. The process as in any of claims 1-5, wherein the pH of the digestate is increased in step a by addition of caustic chemical reagents.

8. The process of claim 7, wherein the caustic chemical reagents include one or more of the hydroxides of sodium, magnesium, potassium or calcium, or magnesium oxide.

9. The process as in any of claims 1-5, wherein the pH of the digestate is increased prior to or at step a by live microorganisms that consume carbon dioxide and/or bicarbonates and/or carbonates.

10. The process of claim 9, further comprising the step of removing oxygen from the immediate vicinity of said microorganisms to enhance their growth and vitality.

11. The process of claim 10, further comprising the step of passing the biogas through a biological treatment process to remove hydrogen sulfide and oxygen therefrom prior to its entry into the precipitation chamber.

12. The process as in any of claims 1-5, wherein the temperature of the stripping chamber is maintained at or above the digester temperature by
   a. increasing the temperature of the digestate prior to its entry into the stripping chamber;
   b. increasing the temperature of the stripping gas; and/or
   c. increasing the temperature of the contents of the stripping chamber.

13. The process as in any of claims 1-5, wherein the stripping chamber is a single reactor or a combination of reactors in parallel or in series, and each reactor is configured as a shallow basin or as a stripping tower.

14. A process as in any of claims 1-5, wherein in step c of claim 1 the stripped ammonia/$CO_2$ gas is blended with biogas that is modified by any combination of
   a. reducing the biogas volume by consuming a portion of the biogas to provide the required volume of carbon dioxide to meet the stoichiometric requirements for ammonium carbonate, bicarbonate precipitation;
   b. adding ammonia to achieve the stoichiometric requirements for ammonium carbonate/bicarbonate precipitation;
   c. removing hydrogen sulfide; and/or
   d. removing methane to produce a tail gas effluent containing methane and carbon dioxide.

15. A process as in any of claims 1-5, wherein the precipitation is carried out in one or more precipitation chambers operating in parallel or series, each precipitation chamber being characterized by one or more of the following characteristics:
   a. a temperature lower than the stripping chamber;
   b. a temperature equal to or less than 35° C.;
   c. a temperature and pressure that enables the production of a solid ammonium carbonate/bicarbonate product within the chamber;
   d. with or without synthetic packing material;
   e. with or without dried organic solids packing material;
   f. with or without composted organic packing material; and/or
   g. with or without excess water removal to produce a dry product.

16. The process of claim 1, further comprising conversion into methane of the high BTU gas effluent from the precipitation chamber.

17. The process of claim 16, wherein the conversion into methane of the high BTU gas effluent from the precipitation chamber includes alkaline scrubbing and/or further $CO_2$ scrubbing of said gas effluent.

18. The process of claim 17, further comprising, prior to step a of claim 1, the step of removing solids from the digestate to form a low suspended solids liquid stream effluent and a solids stream effluent from the digester.

19. The process of claim 18, further comprising the steps of composting and drying the solid stream effluent from the digester to form a dried, composted solids product.

20. The process of claim 19, further comprising blending the dried, composted solids product with the ammonium carbonate/bicarbonate precipitate to produce any desired fertilizer C:N ratio.

21. The process of claim 18, wherein the pH of the liquid stream effluent from the digester is increased by gas stripping or reduced pressure stripping of carbon dioxide.

22. The process of claim 18, wherein the pH of the liquid effluent from the digester is increased by addition of caustic chemical reagents.

23. The process of claim 22, wherein the caustic chemical reagents include one or more of hydroxides of sodium, magnesium, and potassium, and/or one or more of calcium and magnesium oxide.

24. The process of claim 18, wherein the pH of the liquid stream effluent from the digester is increased by live microorganisms that consume carbon dioxide and/or bicarbonate/carbonate.

25. The process of claim 18, wherein the temperature of the stripping chamber is maintained at or above the temperature of the digester by
   a. increasing the temperature of the digestate prior to its entry into the stripping chamber;
   b. increasing the temperature of the stripping gas; and/or
   c. increasing the temperature of the contents of the stripping chamber.

26. The process of claim 18, wherein in step c of claim 1 the stripped ammonia gas is blended with biogas that is modified by any combination of
   a. reducing the biogas volume by consuming a portion of the biogas to provide the required volume of carbon dioxide to meet the stoichiometric requirements for ammonium carbonate, bicarbonate precipitation;
   b. adding ammonia to achieve the stoichiometric requirements for ammonium carbonate/bicarbonate precipitation;
   c. removing hydrogen sulfide; and/or
   d. removing methane to produce a tail gas effluent containing methane and carbon dioxide.

27. The process of claim 18, wherein the precipitation is carried out in one or more precipitation chambers operating in parallel or series, each chamber having any one or more of the following characteristics:
   a. a temperature lower than the stripping chamber;
   b. a temperature equal to or less than 35° C.;
   c. a temperature and pressure that enables the production of a solid ammonium carbonate/bicarbonate product within the chamber;
   d. with or without synthetic packing material;
   e. with or without dried organic solids packing material;
   f. with or without composted organic packing material; and/or
   g. with or without excess water removal to produce a dry product.

28. The process of claim 18, further comprising conversion into methane of the high BTU gas effluent from the precipitation chamber.

29. The process of claim 28, wherein the conversion into methane of the high BTU gas effluent from the precipitation chamber includes alkaline scrubbing and/or further ammonia scrubbing of said gas effluent.

30. The process of claim 1, wherein, prior to step b of claim 1, the liquid stream effluent from the digester is modified by
   a. diluting said effluent to reduce the ammonia concentration through the addition of liquid deficient in ammonia;
   b. diluting said effluent to reduce the ammonia concentration through the addition to the effluent of a substrate to the digester deficient in ammonia;
   c. increasing the ammonia concentration in said effluent by adding ammonia thereto; and/or
   d. increasing the ammonia concentration in said effluent by adding a substrate to the digester containing nitrogen.

* * * * *